Figure 1:
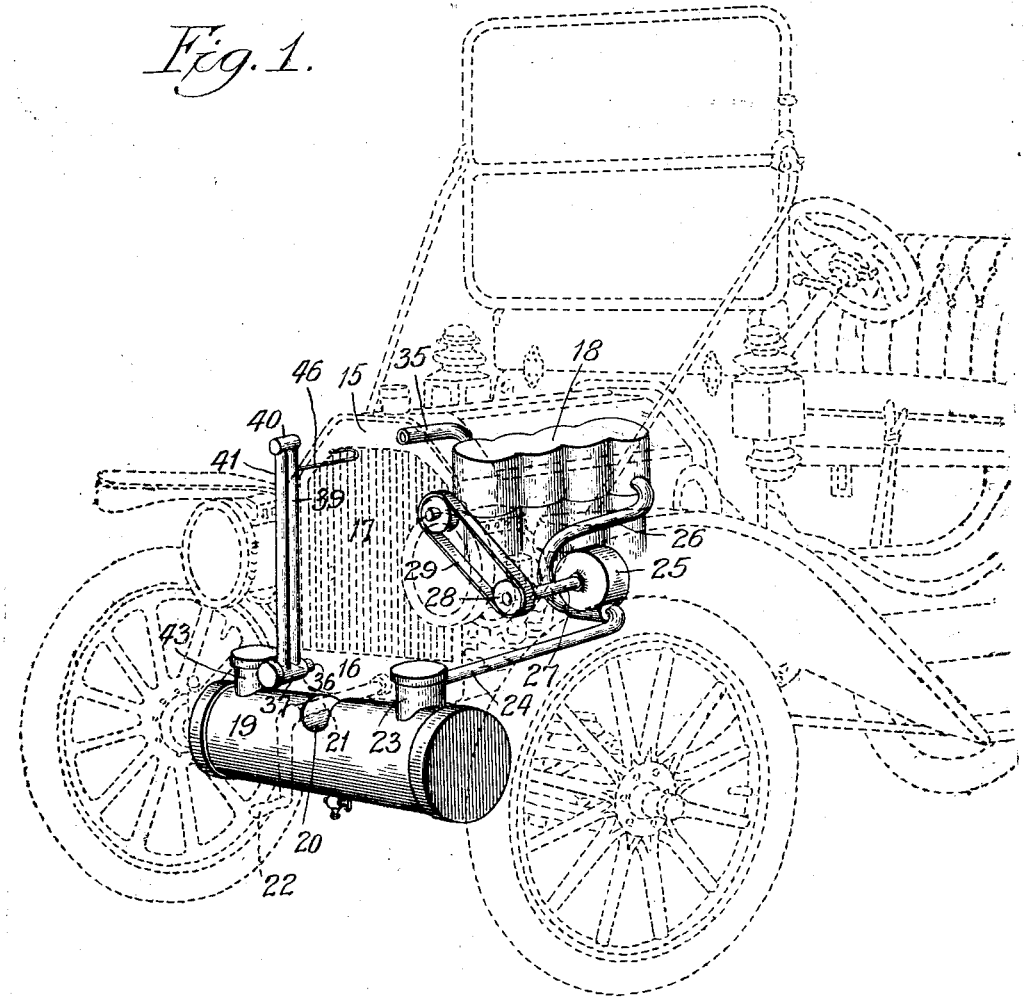

J. W. DALMAN.
WATER COOLING SYSTEM FOR AUTOMOBILE ENGINES.
APPLICATION FILED FEB. 19, 1912.

1,111,787.

Patented Sept. 29, 1914.

5 SHEETS—SHEET 1.

Witnesses:
John Enders
Henry A. Parks

Inventor:
John W. Dalman,
by Sheridan, Wilkinson, Scott & Richmond,
Attys.

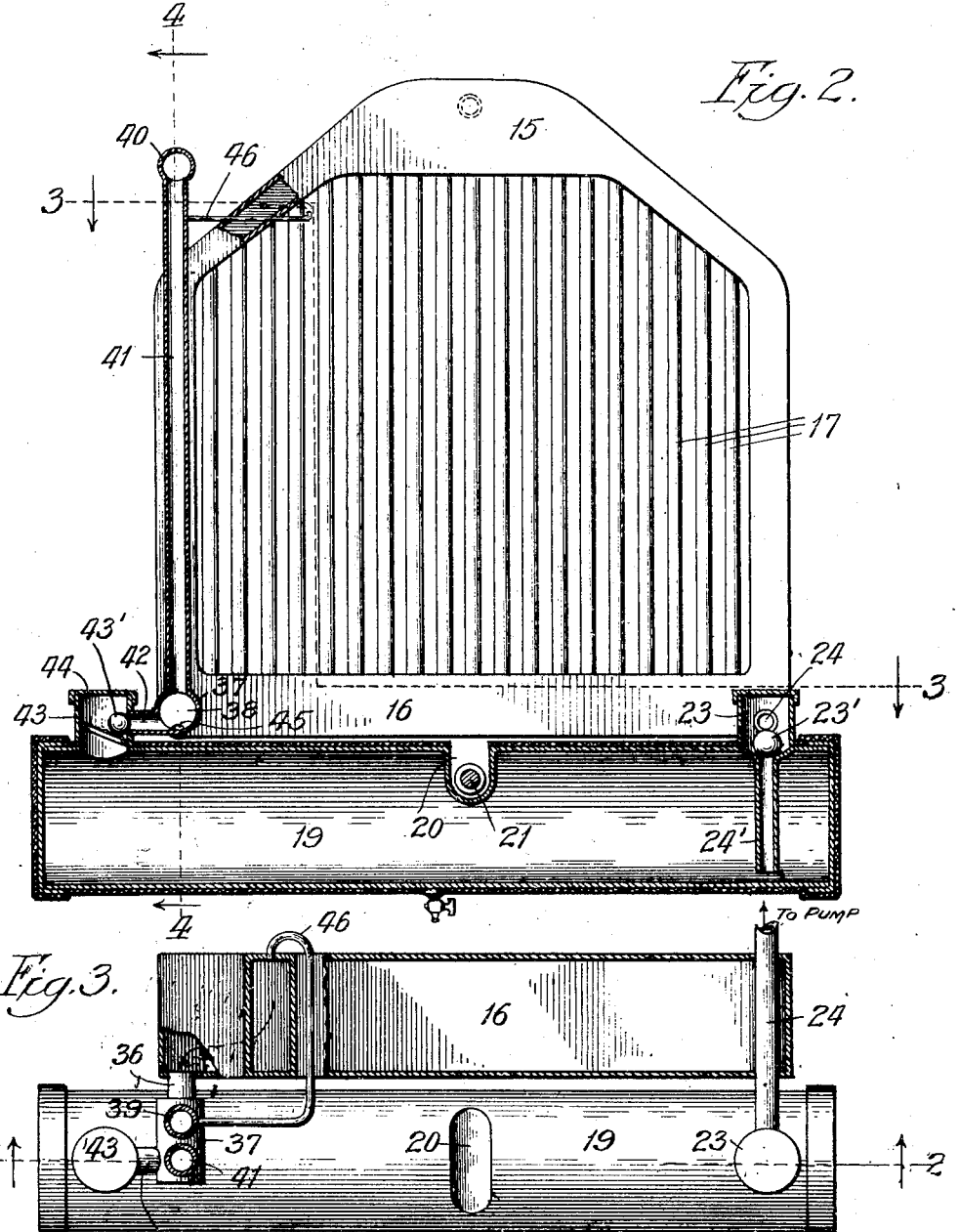

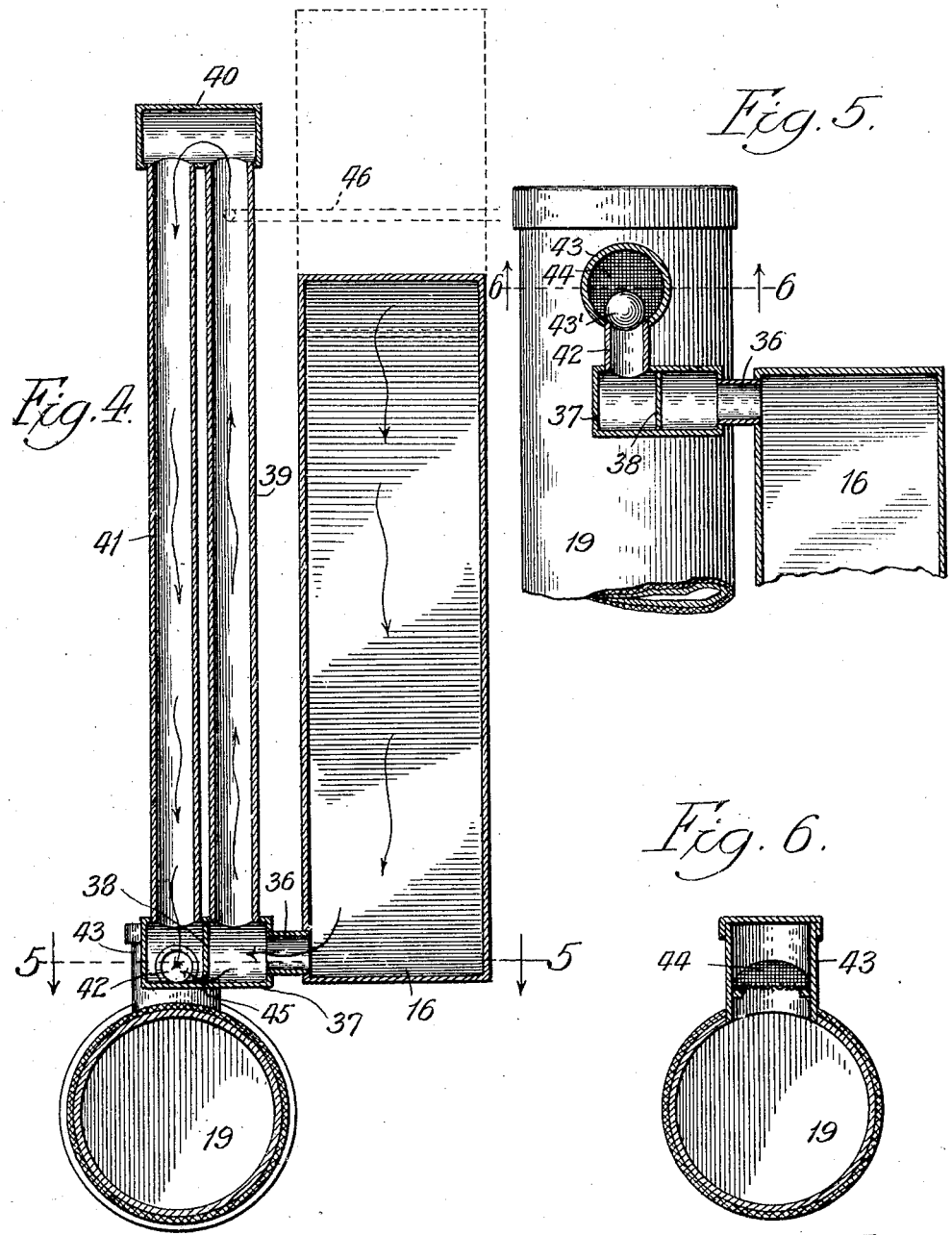

J. W. DALMAN.
WATER COOLING SYSTEM FOR AUTOMOBILE ENGINES.
APPLICATION FILED FEB. 19, 1912.
1,111,787.
Patented Sept. 29, 1914.
5 SHEETS—SHEET 5.
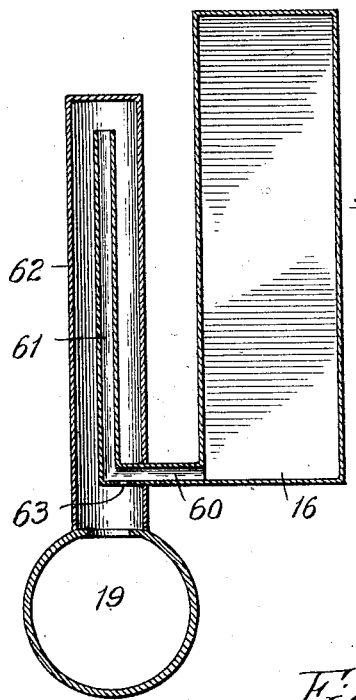
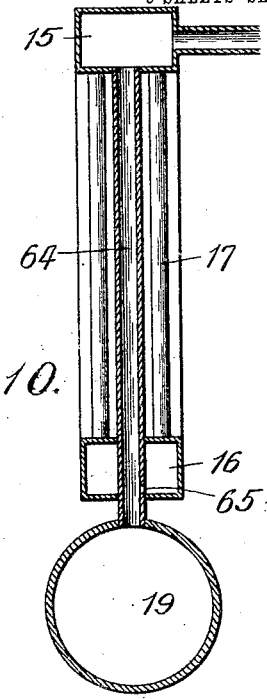
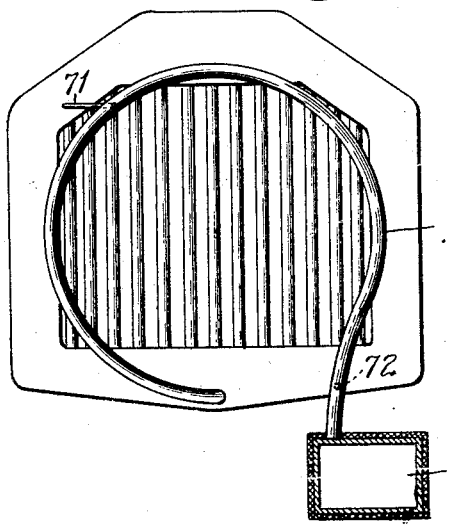
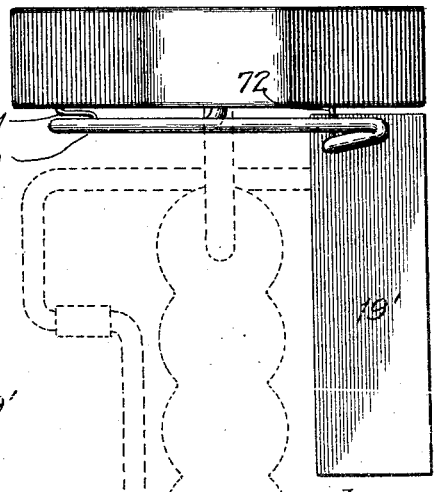
Witnesses:
John Enders
Henry A. Parks
Inventor:
John W. Dalman,
by Sheridan, Wilkinson, Scott & Richmond.
Attys.

UNITED STATES PATENT OFFICE.

JOHN W. DALMAN, OF CHICAGO, ILLINOIS.

WATER-COOLING SYSTEM FOR AUTOMOBILE-ENGINES.

1,111,787.

Specification of Letters Patent. Patented Sept. 29, 1914.

Application filed February 19, 1912. Serial No. 678,449.

*To all whom it may concern:*

Be it known that I, JOHN W. DALMAN, a citizen of the United States, residing at Chicago, in the county of Cook and State of Illinois, have invented certain new and useful Improvements in Water-Cooling Systems for Automobile-Engines, of which the following is a specification.

The principal object of my invention is to provide a new and improved water circulating system for cooling an automobile engine.

Another object of my invention is to provide a water cooling system for an automobile that shall automatically drain the water into a reservoir when not in use, so as to prevent injury by freezing.

Another object of my invention is to provide a water circulating system for an automobile engine jacket that shall keep the radiator full of water when in use, but shall drain the radiator, engine jacket, and connected pipes into a reservoir when not in use.

These objects, and others, will be made apparent in the following specification and claims, taken in connection with the accompanying drawings.

For the purpose of distinctly explaining the nature of my invention I have illustrated one specific embodiment thereof, together with a few modifications in the accompanying drawings, and I now proceed to describe the devices shown in the drawings and to explain their manner of operation.

The invention is defined in the appended claims.

Figure 7:
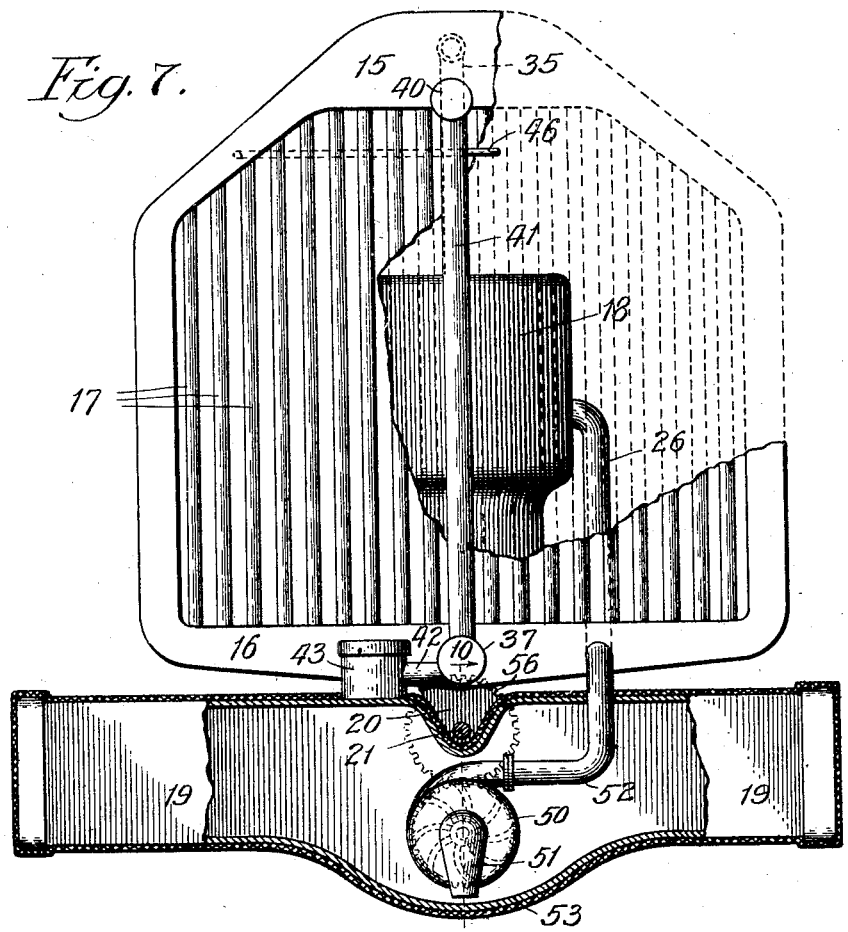
Figure 8:
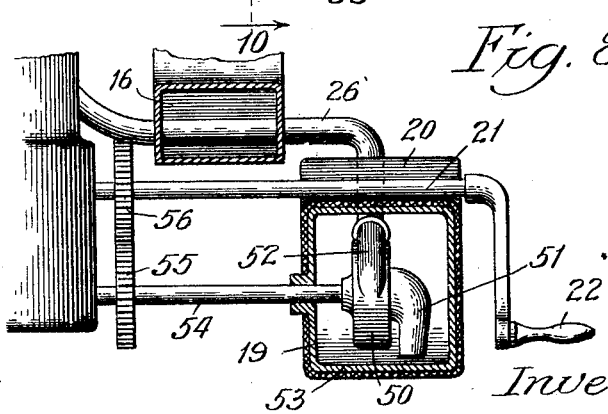

Referring to the drawings—Figure 1 is a perspective view of an automobile showing my improved water circulating system for engine jackets. Fig. 2 is a vertical section on the line 2—2 of Fig. 3 looking in the direction of the arrows. Fig. 3 is a horizontal section on the broken line 3—3 of Fig. 2 looking in the direction of the arrows. Fig. 4 is a vertical section on the line 4—4 of Fig. 2 looking in the direction of the arrows. Fig. 5 is a horizontal section on the line 5—5 of Fig. 4 looking in the direction of the arrows. Fig. 6 is a vertical section on the line 6—6 of Fig. 5 looking in the direction of the arrows. Fig. 7 is a front elevation, partly broken away, of an automobile radiator showing my invention embodied in a somewhat different form. Fig. 8 is a fragmental vertical section of the same on the line 10—10 of Fig. 9. Figs. 9 and 10 are vertical sections showing further modifications of my invention; and Figs. 11 and 12 are, respectively, a rear elevation and plan of a further modification.

Referring now to Figs. 1 to 6, inclusive, the usual automobile radiator is shown with the upper and lower headers 15 and 16 connected by the vertical tubes 17. The water cooling jacket for the engine is designated 18. Below the radiator and engine jacket is a tank or reservoir 19 with the notch 20 on its upper side to accommodate the extended crank shaft 21 carrying the starting crank 22. At one end of the tank 19 is a turret 23, from which a pipe 24 leads to the pump designated generally as 25. A pipe 24′ leads from the bottom of the tank 19 to said turret 23, making with pipe 24 and turret 23 a continuous suction pipe for the pump 25. A light weight ball valve 23′ within the turret 23 closes the opening of pipe 24′, except when floated up by water or drawn up by suction. The pump 25 is driven by the shaft 27, band wheel 28, and band 29. The delivery pipe 26, leading from the pump 25, goes to the engine jacket 18, and from there the pipe 35 leads to the upper header 15 of the radiator.

A short pipe 36 connects the lower header 16 of the radiator to the small drum 37, which is divided into two parts by the partition 38, with a small opening 45 therethrough. The two vertical pipes 39 and 41 are connected at their lower ends to the drum 37 on opposite sides of the partition 38, and at their upper ends the pipes 39 and 41 are connected together by the coupling 40.

From the drum 37 a short pipe 42 extends to the turret 43 standing on the tank 19. This turret 43 carries an inclined strainer 44, on which rests a light weight ball valve 43′ adapted to close the opening of pipe 42, unless floated or pushed aside by the water. A pipe 46, of small cross section, connects the upper header 15 to the upper end of the vertical tube 39.

When the automobile is in normal operation the pump 25 will draw water from the bottom of the tank 19 through the pipes 24′ and 24 and deliver this water to the engine jacket 18 through the pipe 26, forcing it therethrough and out through the pipe 35 into the upper header 15. The water will fill the tubes 17 of the radiator, and will be forced out from the lower header 16 and up through the pipe 39, then down through the pipe 41 and into the tank 19, thus completing the cycle of its circulation.

By making the water rise in the pipe 39 after it leaves the lower header 16 I am able to maintain the radiator tubes 17 full of water all the time, and thereby get the greatest cooling effect on the circulating water. If the water were to discharge from the lower header 16 directly into the tank 19, then it would have a tendency to simply fall down through the tubes 17, and they would be partially empty, so that the water would be less exposed to cooling by radiation from the tubes 17.

The pump 25 is so constructed as to permit the water to drain back into the tank 19 from the engine jacket 18 when the automobile is standing idle. Also, the restricted opening 45 permits the water to drain from the radiator into the tank 19. The small pipe 46, connecting the upper header 15 with the tube 39, prevents the tubes 39 and 41 and coupling 40 from acting as a siphon to drain the water from the radiator below the level of the pipe; that is, if a siphon action in said tubes 39 and 41 lowered the water level in the radiator, then the water column in the pipe 39 would be broken as soon as the water level in the radiator got down to the tube 46, and thus the lowering further of the water in the radiator would be arrested.

The valves 23' and 43' automatically open and permit the water to circulate freely through the water system when the engine and pump are in operation. As soon as the engine and pump are stopped and the water from the water system has drained back into reservoir 19 so that no water remains to float these valves 23' and 43', then they automatically seat and cut off communication between reservoir 19 and the rest of the water system, thereby preventing loss of heat through the openings into reservoir 19.

The removable strainer 44 prevents large particles of foreign matter from entering the tank 19 with the circulating water. The cap over turret 43 can be removed when desired for the purpose of cleaning the strainer 44.

The tank 19 can be drained through the drain cock at the bottom when this is desired for any reason, as, for example, to leave the automobile in freezing weather for a long time. When the tank is to be filled this can be done by removing the cap over the turret 43, and as the water is poured into the tank 19 the strainer 44 will prevent larger particles of foreign matter from entering therewith. It will be observed that I have shown no filling cap whatever at the top of the radiator. This is because with my system such a filling cap is entirely unnecessary. Indeed, there is this advantage in filling at the turret 43—it insures that no excess of water shall be introduced into the system, because when the tank 19 is full that affords a sufficient amount of water and no more water can be introduced without its overflowing at the turret 43.

Referring now to Figs. 7 and 8; in this case the general circulatory system is the same as previously described, except that the pump 50, which is of the centrifugal type, is within the tank 19, which has a depression 53 on its under side from which the intake tube 51 draws. The discharge pipe 52 connects with the previously described pipe 26 going to the engine jacket 18. The pump shaft 54 is driven from the extended crank shaft 21 by means of gears 55 and 56. The stand pipes 39 and 41 are at the center, and the bottom wall of the lower header 16 slopes to the outlet opening.

Referring now to Fig. 9, the pipe 60 from the lower header of the radiator has a small outlet opening 63 beyond which point it extends upwardly, designated as 61 within the surrounding casing 62. The annular space between the pipe 61 and the casing 62 may be large enough so that it will not form a siphon, and the water will simply spill down from the upper end of the tube 61 without forming a solid downwardly moving water column within the casing 62. In this case the small orifice 63 performs the same function as the small opening 45 previously described.

In Fig. 10 the water is delivered from the upper part of the radiator through the large outlet pipe 64 leading down among the tubes 17 to the tank 19. A by-pass opening 65, of restricted size, leads from the lower header 16 of the radiator into the tank 19.

In the form of my invention illustrated in Figs. 11 and 12, the tube 70 goes from the lower header 16 up around the rear face of the radiator and down into tank 19', which in this case extends longitudinally. At 71 and 72 there are connections of small cross section between the tube 70 and the radiator. These are, respectively, to break a siphon and give complete drainage, as already explained.

It will be seen that in all the forms of my invention the radiator, engine jacket, and connections are kept approximately full when in operation, but that they automatically drain into the tank 19 when the engine is at rest.

It will be observed that by my invention the water is kept circulating through the engine jacket and the radiator of the automobile, and the radiator tubes are kept full of water when operating ordinarily. But when the engine is standing still the water all drains into the tank 19. This tank may be conveniently insulated and the water being in a compact body therein will not freeze for a long time. When desired the tank 19 can be readily drained through the drain cock at the bottom.

I claim:

1. In a device of the class described, an engine, a cooling system comprising a water jacket, a radiator, a reservoir at a lower level than said radiator, and a duct leading from the lower part of said radiator upward to a point adjacent the top thereof, a second duct communicating with the upper part of said first mentioned duct and with said reservoir, and means for stopping the flow of water from said radiator through said ducts when the water in said radiator has drained to a predetermined level.

2. In a device of the class described, an engine, a cooling system comprising a water jacket, a radiator, a reservoir at a lower level than said radiator, a duct leading from the lower part of said radiator upward to a point adjacent the top thereof, a duct communicating with the upper part of said first mentioned duct and with said reservoir, and a duct leading directly from the lower part of said radiator to said reservoir.

3. In a device of the class described, an engine, a cooling system comprising a water jacket, a radiator, a reservoir at a lower level than said radiator, means for permitting a flow of water from the lower part of said radiator to said reservoir, and means for permitting an additional flow of water from said radiator to said reservoir when the water level in said radiator reaches a predetermined level.

4. In a device of the class described, a cooling system comprising a water jacket, a radiator, a reservoir at a lower level than said radiator, a pump, a duct leading directly from the lower part of said radiator to said reservoir, said duct being of insufficient size to conduct the normal flow caused by said pump, and a second larger duct leading from said radiator to said reservoir, said second duct being operative only when said radiator is substantially full of water.

5. In a device of the class described, an engine, a cooling system comprising a radiator, a water jacket, a duct leading from said water jacket to said radiator, a reservoir at a lower level than said radiator, means for permitting a flow of water from the lower part of said radiator to said reservoir, additional means for permitting a flow of water from said radiator to said reservoir when the water level in said radiator reaches a predetermined level, and a pump for forcing water from said reservoir through said jacket and into said radiator.

6. In a device of the class described, an engine, a cooling system comprising a water jacket, a radiator, a reservoir at a lower level than said radiator, a duct leading from the lower part of said radiator to said reservoir, a second duct leading from the lower part of said radiator to a point adjacent the top thereof, and a third duct communicating with the upper part of said second duct and with said reservoir.

7. In a device of the class described, an engine, a cooling system comprising a water jacket, a radiator, a reservoir at a lower level than said radiator, a duct extending upward from the lower part of said radiator to a point adjacent the top thereof and thence downward to said reservoir, and an air duct leading from the upper part of said first mentioned duct to the upper part of said radiator.

In testimony whereof, I have subscribed my name.

JOHN W. DALMAN.

Witnesses:
CARL A. RICHMOND
HENRY A. PARKS.